United States Patent Office 3,301,624
Patented Jan. 31, 1967

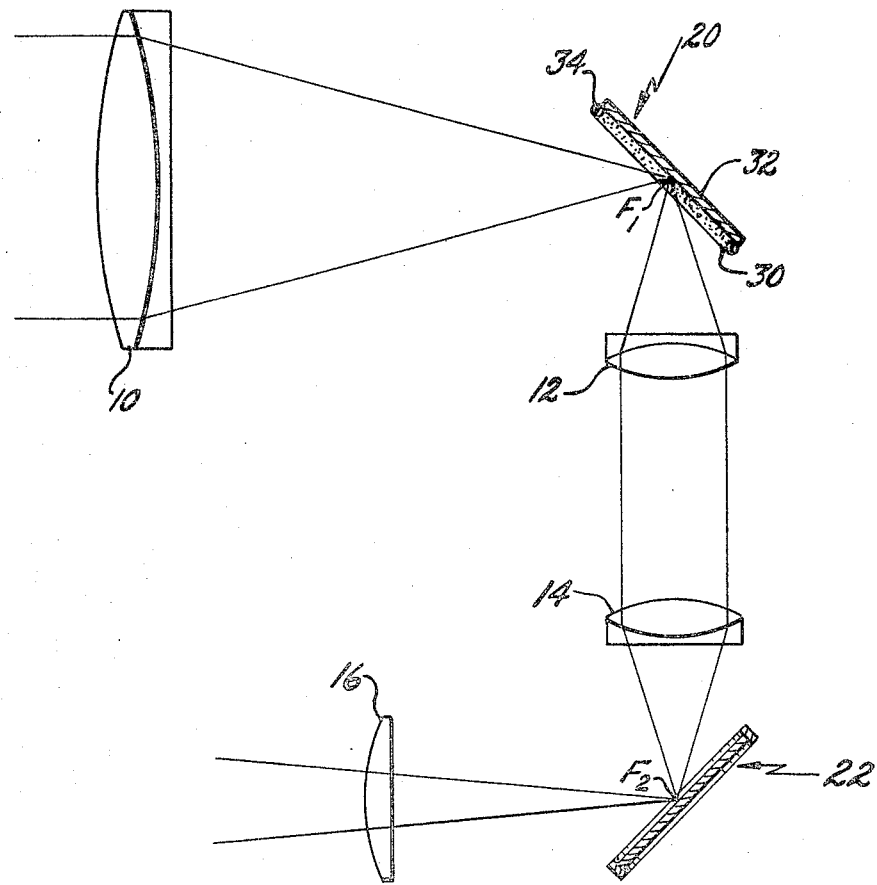

3,301,624
PROTECTIVE OPTICAL SYSTEM WITH OFFSET LIGHT PATH AND FUSIBLE OPTICAL MIRROR
Herbert A. Morriss, Jr., Shreveport, La., assignor to the United States of America as represented by the Secretary of the Air Force
Filed July 12, 1962, Ser. No. 209,477
4 Claims. (Cl. 350—52)

The invention described herein may be manufactured and used by or for the United States Government for governmental purposes without payment to me of any royalty thereon.

This invention relates generally to protective devices for image sensing means and, more particularly, to fusible optical mirrors for interrupting the path of an image through an optical system.

Devices of this nature are utilized to permit normal and uninhibited use of optical instruments while providing for protection of the human eye in the event that the sun or a fireball of a nuclear explosion falls within the field of view.

The previous practice for providing protection was to introduce a material of sufficient density to diminish or obstruct the passage of light, thereby protecting the image sensing means and/or the eye of a user of optical equipment. This method for providing protection has been performed by interposing a neutral filter of sufficient density to permit safe viewing; however, the utilization of this type of system requires advance information with regard to the presence of a destructive image and, in addition, makes the viewing of objects of conventional brilliance either difficult or impossible. Automatic shutter devices in combination with a sensing means have been proposed to be utilized such that closure of the shutter occurs when an object of predetermined brilliance, as determined by the sensing means, comes into view. This method suffers from the disadvantage of having a time lag between the arrival of the image stimulus and the response of the sensing means and the occluding mechanism. Phototropic materials which rapidly increase in density with a brilliant image have also been proposed as a protective device; however, since the filter material responds to the actinic level of the image rather than to the thermal content, it is not satisfactory.

Accordingly, it is an object of this invention to provide a device which interrupts the path of an image through through an optical system when the radiant thermal energy associated with the image reaches a predetermined level.

It is another object of this invention to provide a method for protection of and a protective device for image sensing means in an optical system which avoids the disadvantages of previously proposed systems.

It is still another object of this invention to provide a protective device for sensing means utilized with an optical system whereby the geometry of the optical system is disrupted.

It is a further object of this invention to provide a device in an optical system which terminates the optical transmission path when an object of a predetermined thermal energy level is imaged.

It is a still further object of this invention to provide a fusible optical mirror which may be utilized with any optical system to provide protection of the system with images of destructive brilliance.

Another object of this invention is to provide a fusible optical mirror, the operation of which is instantaneous upon the reflection thereon of an image with a predetermined level of radiant thermal energy.

Still another object of this invention involves the protection of optical systems against the transmission of intolerably brilliant images while permitting the normal light gathering path of the system to be exploited in viewing objects providing an image of normal intensity.

Still another object of this invention involves the protection of a fusible optical mirror which may be manufactured of conventional currently available material which lends themselves to mass production manufacturing techniques.

These and other advantages, features and objects of the invention will become more apparent from the following description taken in connection with the illustrative embodiment in the accompanying drawing wherein the figure is a schematic representation of an optical system in which the fusible optical mirror of this invention may be utilized.

Referring to the figure, there is shown a conventional optical system representing a terrestrial telescope which is altered to include a pair of mirrors in order to provide for the displacement of the viewing and objective ends of the instrument. A distant object is first focused at $F_1$ by means of the objective lens 10. Lenses 12 and 14 form a two lens erecting system. Thus, distant objects, having been brought to focus at $F_1$, are erected at $F_2$ and directed to eyepiece 16, which images the object on the retina of the eye of a viewer. Generally, the elements thus far described form a terrestrial telescope and would normally be located on a single axis.

In order to provide protection against intolerably brilliant objects, the normal, straight through path of the terrestrial telescope is diverted by means of optically flat mirrors 20 and 22. Mirror 22 is a conventional first surface mirror placed at $F_2$ while mirror 20 is placed at the focal point $F_1$ of the objective lens at which the first image of an object infinitely far away would be formed.

Mirror 20 is silvered in the manner of second-surface mirrors and is formed of a membrane 30 which has silver or other specular material applied to the rear surface thereof at 32 by vacuum, chemical or electrolytic deposition of sufficient thickness to provide a fully reflecting surface for images in the visual range of the spectrum. The membrane material may be of gelatinous construction similar to that utilized with pellicle mirrors for photographic image separation or, alternatively, may be an extremely thin film of plastic such as polyethylene. Having knowledge of the thermal energy level which is harmful to the eye or other sensing means, the thickness of the membrane may be chosen within the limit of its light transmission characteristics to allow for destruction of the mirror prior to reaching such thermal energy level. By utilizing a second-surface mirror the energy, which is reflected, passes through the heat sensitive supporting membrane twice in order to continue through the entire optical system, thereby improving the safety of the device.

One method of making the gelatinous based mirror capable of being destroyed at a caloric input of approximately .04 cal./cm.$^2$, blow the harmful thermal energy level to the retina, would be to utilize a ring or wire form which is dipped into a gelatin solution. A solution which would be satisfactory would be approximately 2-5 percent of gelatin added to cold water and heated to a temperature below its boiling point, e.g., approximately 180°. The thickness of the ring would determine the thickness of the gelatin, and with a high bloom, high viscosity gelatin solution, the gelatin in the ring would be uniform. The gelatin membrane may also be cast in a vacuum to avoid bubbles in the end product.

Although the invention has been described relative to a terrestrial telescope, it may be applied to any optical system in which it is possible to form an image which is the virtual object of a viewing or sensing element. Other systems falling within this category are the theodolite, the optical tracking head for fire control, and the prism binocular. In addition, the invention may be adapted to real image systems such as photographic or photosensing devices by interposing a refracting system containing the fusible mirror in front of the objective lens of the system to be protected.

Although the invention has been described with reference to a particular embodiment, it will be understood by those skilled in the art that the invention is capable of a variety of alternative embodiments within the spirit and scope of the appended claims.

I claim:
1. An optical system comprising:
   an objective lens,
   a fusible second surface mirror oriented at an angle to the optical axis of said objective lens for diverting the passage of light through the optical system from a straight line, said fusible second surface mirror being positioned at the focal point of said objective lens at which the first image of an object indefinitely far away would be formed, said fusible second surface mirror being comprised of
   a thin membrane of material capable of fusion at a predetermined thermal energy level of the light at the focal point,
   a coating of specular material on the rear surface of said membrane to provide a reflecting surface said coating being of a thickness to render the reflecting surface fully reflective while still being dependent upon said membrane for structural support,
   a two lens erecting system positioned to receive images reflected from said fusible second surface mirror,
   an optically flat mirror positioned at an angle to said two lens erecting system at the focal point of an erected image from said two lens erecting system, and
   an eyepiece positioned to receive images reflected from said optically flat mirror.

2. An optical system as defined in claim 1 wherein the thickness of said membrane is such that a caloric input of about .04 calories per square centimeter causes a destruction of said fusible second surface mirror thereby diverting the passage of light from said two lens erecting system, optically flat mirror and eyepiece.

3. An optical system as defined in claim 1 wherein said membrane is of gelatin and is supported in a ring.

4. An optical system as defined in claim 1 wherein said membrane is of polyethylene and is supported in a ring.

References Cited by the Examiner

UNITED STATES PATENTS

| 1,060,447 | 4/1913 | Geisler | 88—105 |
| 1,777,308 | 10/1930 | Holweck | 88—105 |
| 2,281,637 | 5/1942 | Sukumlyn | 88—61 X |
| 2,377,064 | 5/1945 | Aufiero. | |
| 3,054,328 | 9/1962 | Rodgers | 88—73 |
| 3,059,364 | 10/1962 | Landsberg et al. | |
| 3,213,752 | 10/1965 | Ruderman | 88—1 X |

FOREIGN PATENTS

| 380,473 | 9/1932 | Great Britain. |

OTHER REFERENCES

Muirhead et al.: "Rapid-Opening Electronically-Operated Shutter" article in "Review of Scientific Instruments," vol. 32, October 1961, pp. 1148 and 1149 cited.

DAVID H. RUBIN, *Primary Examiner.*